United States Patent
Peng

(10) Patent No.: US 9,977,276 B2
(45) Date of Patent: May 22, 2018

(54) ARRAY SUBSTRATE, DISPLAY PANEL AND DISPLAY DEVICE

(71) Applicants: Xiamen Tianma Micro-Electronics Co., Ltd., Xiamen (CN); Tianma Micro-Electronics Co., Ltd., Shenzhen (CN)

(72) Inventor: Tao Peng, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

(*) Notice: Subject to any disclaimer, the term of this patent is extended or adjusted under 35 U.S.C. 154(b) by 0 days. days.

(21) Appl. No.: 15/636,572

(22) Filed: Jun. 28, 2017

(65) Prior Publication Data

US 2017/0299908 A1 Oct. 19, 2017

Related U.S. Application Data

(63) Continuation-in-part of application No. 14/884,673, filed on Oct. 15, 2015, now Pat. No. 9,720,543.

(30) Foreign Application Priority Data

May 8, 2015 (CN) .......................... 2015 1 0232163

(51) Int. Cl.
*G02F 1/1333* (2006.01)
*G06F 3/041* (2006.01)
(Continued)

(52) U.S. Cl.
CPC .... *G02F 1/13338* (2013.01); *G02F 1/133345* (2013.01); *G02F 1/133512* (2013.01);
(Continued)

(58) Field of Classification Search
CPC ......... G06F 2203/04103; G06F 3/0412; G06F 3/044; G06F 3/0416
See application file for complete search history.

(56) References Cited

U.S. PATENT DOCUMENTS

2011/0122084 A1* 5/2011 Jeon .................... G02F 1/13338
345/173
2011/0228188 A1 9/2011 Kim et al.
(Continued)

FOREIGN PATENT DOCUMENTS

CN 101598864 A 12/2009
CN 104330935 A 2/2015
(Continued)

*Primary Examiner* — Gerald Johnson
(74) *Attorney, Agent, or Firm* — Faegre Baker Daniels LLP

(57) ABSTRACT

An array substrate and a display panel are disclosed. The display panel includes: a color filter substrate; an array substrate; and a liquid crystal layer disposed between the color filter substrate and the array substrate. The color filter substrate is divided into opaque regions and light-transmissive regions by a black matrix. The array substrate includes pixel regions defined by gate lines and data lines, pixel electrodes, first signal lines, and common electrodes. The common electrodes and the first signal lines are electrically connected through bridge structures. Each bridge structure includes a first part, a second part, and a third part. The first part is connected to one of the first signal lines, the third part is connected to one of the common electrodes, and a projection of the second part falls within a projection of one of the data lines or one of the gate lines.

20 Claims, 19 Drawing Sheets

(51) Int. Cl.
*G02F 1/1362* (2006.01)
*G02F 1/1343* (2006.01)
*G02F 1/1335* (2006.01)
*G02F 1/1368* (2006.01)

(52) U.S. Cl.
CPC .. *G02F 1/133514* (2013.01); *G02F 1/134309* (2013.01); *G02F 1/136286* (2013.01); *G06F 3/0412* (2013.01); *G02F 1/1368* (2013.01); *G02F 2001/133302* (2013.01); *G02F 2001/134345* (2013.01); *G02F 2201/121* (2013.01); *G02F 2201/123* (2013.01); *G06F 3/0416* (2013.01); *G06F 2203/04103* (2013.01); *G06F 2203/04111* (2013.01)

(56) References Cited

U.S. PATENT DOCUMENTS

| | | | |
|---|---|---|---|
| 2013/0162570 A1 | 6/2013 | Shin et al. | |
| 2014/0168150 A1* | 6/2014 | Kim | G02F 1/136204 345/174 |
| 2015/0116385 A1 | 4/2015 | Lee et al. | |
| 2015/0309644 A1* | 10/2015 | Sun | G06F 3/0412 345/173 |
| 2016/0202580 A1* | 7/2016 | Hong | G02F 1/136227 257/72 |

FOREIGN PATENT DOCUMENTS

| | | |
|---|---|---|
| CN | 104516145 A | 4/2015 |
| KR | 20130141795 A | 12/2013 |

\* cited by examiner

ARRAY SUBSTRATE, DISPLAY PANEL AND DISPLAY DEVICE

CROSS-REFERENCE TO RELATED APPLICATION

This application is a continuation-in-part of U.S. patent application Ser. No. 14/884,673, filed Oct. 15, 2015, which claims priority to Chinese Application No. 201510232163.7, filed May 8, 2015, both of which are hereby incorporated by reference herein in their entirety.

BACKGROUND

A Liquid Crystal Display (LCD) is a flat panel display. With the development of science and technology, electronic products containing the LCD are developed to be lightweight, thin, short and compact, and have advantages such as right-angle display, low power consumption, a small size, and to be free of radiation, which allow users to enjoy the best visual environment.

A display having a touch sensing function is derived from technology for function diversity. Generally, touch technology includes in-cell touch style and on-cell touch style. The in-cell touch style refers to incorporating a touch sensing structure into an array substrate or an opposite substrate in the display panel, while the on-cell touch style refers to embedding the touch sensing structure between a color filter substrate and a polarizing plate. The In-cell touch style makes the display lighter and thinner and thus arouses more attention.

SUMMARY

Embodiments of the disclosure provide an array substrate, a display panel and a display device. Because the touch sensing electrode lines need to electrically connect with the touch electrodes by bridging structures, the disclosure provides embodiments of the bridging structure, that increases a distance between the bridging structure and the pixel electrode so as to ensure good electrical insulation between the bridging structure and the pixel electrode adjacent to the bridging structure and reduce a probability of short circuit.

In a first example, embodiments of the disclosure provide an array substrate, including:
  a substrate;
  a plurality of scan lines and a plurality of data lines disposed on the substrate;
  a plurality of sub-pixels arranged in an array, which are defined by the data lines and the scan lines insulatedly intersecting the data lines;
  a plurality of touch sensing electrodes disposed in an array, each of which corresponds to one pixel region comprising a plurality of first sub-pixels and at least one second sub-pixel; and
  a plurality of first signal lines extending along a first direction, with each of the touch sensing electrodes being electrically connected with at least one of the first signal lines by a first bridging structure disposed in a first inactive display region,
  wherein, an area of a second sub-pixel electrode in the second sub-pixel is smaller than that of a first sub-pixel electrode in the first sub-pixel, and the first inactive display region is provided in the second sub-pixel.

In a second example, embodiments of the disclosure provide a display panel, including the array substrate of any of the embodiments described above.

In a third example, embodiments of the disclosure provide a display device, including the display panel described above.

In a fourth example, embodiments of the disclosure provide another array substrate and another display panel. A first signal line is electrically connected to a common electrode by a bridge structure that is disposed in a position corresponding to a black matrix. A projection of the bridge structure on a color filter substrate falls within opaque regions.

The array substrate includes:
  a gate line;
  a data line intersecting but insulated from the gate line;
  a pixel region defined by the gate line and the data line;
  a pixel electrode corresponding to the pixel region;
  a first signal line; and
  a common electrode that covers at least one pixel region,
  wherein the common electrode is electrically connected to the first signal line through the bridge structure, the bridge structure comprises a first part, a second part and a third part electrically connected to each other, the second part and the pixel electrode are arranged in a same layer, the first part and the third part extend in a direction perpendicular to the array substrate, the first part of the bridge structure is directly connected to the first signal line, the third part of the bridge structure is directly connected to the common electrode, and a projection of the second part of the bridge structure on the array substrate falls within a projection of the data line on the array substrate or within a projection of the gate line on the array substrate.

The display panel includes:
  a color filter substrate;
  an array substrate disposed opposite to the color filter substrate; and
  a liquid crystal layer disposed between the color filter substrate and the array substrate,
  wherein the color filter substrate comprises a black matrix that divides the color filter substrate into opaque regions and light-transmissive regions, and
  the array substrate comprises a gate line; a data line intersecting but insulated from the gate line; a pixel region defined by the gate line and the data line; a pixel electrode corresponding to the pixel region; a first signal line; and a common electrode that covers at least one of pixel region,
  wherein the common electrode is electrically connected to the first signal line by a bridge structure, the bridge structure comprises a first part, a second part and a third part electrically connected to each other, the second part and the pixel electrode are arranged in a same layer, the first part and the third part extend in a direction perpendicular to the array substrate, the first part of the bridge structure is directly connected to the first signal line, the third part of the bridge structure is directly connected to the common electrode, and a projection of the second part of the bridge structure on the array substrate falls within a projection of the data line on the array substrate or within a projection of the gate line on the array substrate.

In the disclosure, the first sub-pixel and the second sub-pixel are different from each other and provided in the array substrate, where the area of the second sub-pixel electrode in the second sub-pixel is smaller than that of the first sub-pixel electrode in the first sub-pixel, the first inactive display region is provided in the second sub-pixel (which includes the second sub-pixel electrode having a smaller area), and the first bridging structure for electrically connecting the touch sensing electrode with the first signal line is provided within the first inactive display region. In this way, embodiments can increase the space between the bridging structure and the pixel electrodes, which reduces the probability of short circuit and improves yield.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

Figure 1:
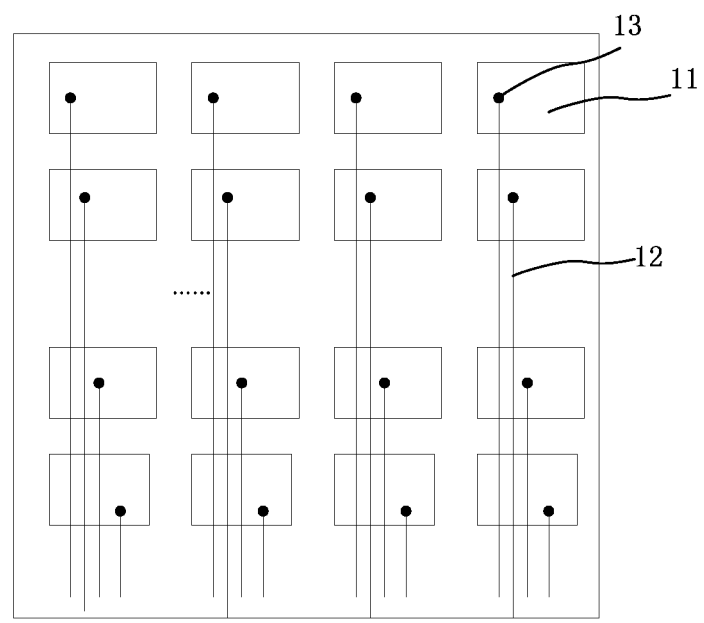
FIG. 1 is a schematic diagram showing an array substrate having a touch function provided in the related art.

While the disclosure is amenable to various modifications and alternative forms, embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

The disclosure is described in detail below with reference to the drawings. It may be understood that specific embodiments described herein are merely for explaining the disclosure rather than limiting the disclosure. In addition, it should be illustrated that merely partial content associated with the disclosure rather than all possible content is illustrated in the accompanying drawings for ease of description.

Wiring of touch sensing electrode lines according to the in-cell touch technology in the related art are shown in FIG. 1, in which touch sensing electrodes 11 are reused as (i.e. operable as) a common electrode, and touch sensing electrode lines 12 are generally connected electrically with the touch sensing electrodes 11 by vias 13.

In this disclosure, there are first sub-pixels and second sub-pixels that are different from each other and provided in the array substrate, where the area of the second sub-pixel electrode in the second sub-pixel is smaller than that of the first sub-pixel electrode in the first sub-pixel, the first inactive display region is provided in the second sub-pixel (which includes the second sub-pixel electrode having a smaller area), and the first bridging structure for electrically connecting the touch sensing electrode with the first signal line is provided within the first inactive display region.

Figure 2A:
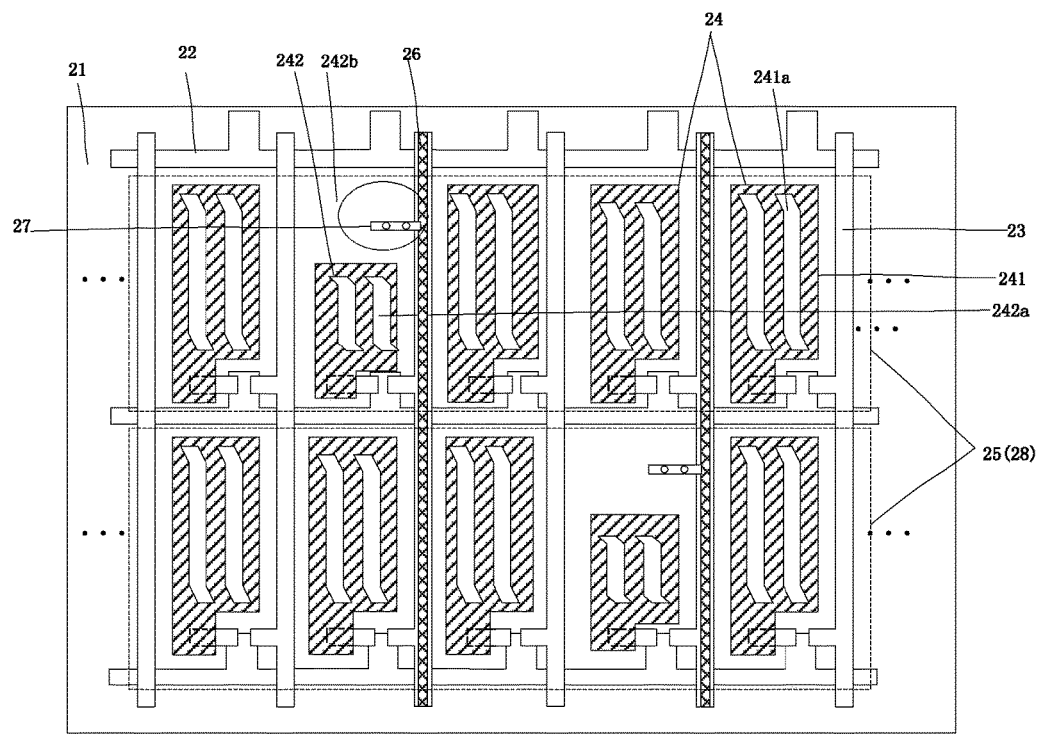
FIG. 2A is a schematic diagram showing the structure of an array substrate, according to embodiments of the disclosure.
Figure 2B:
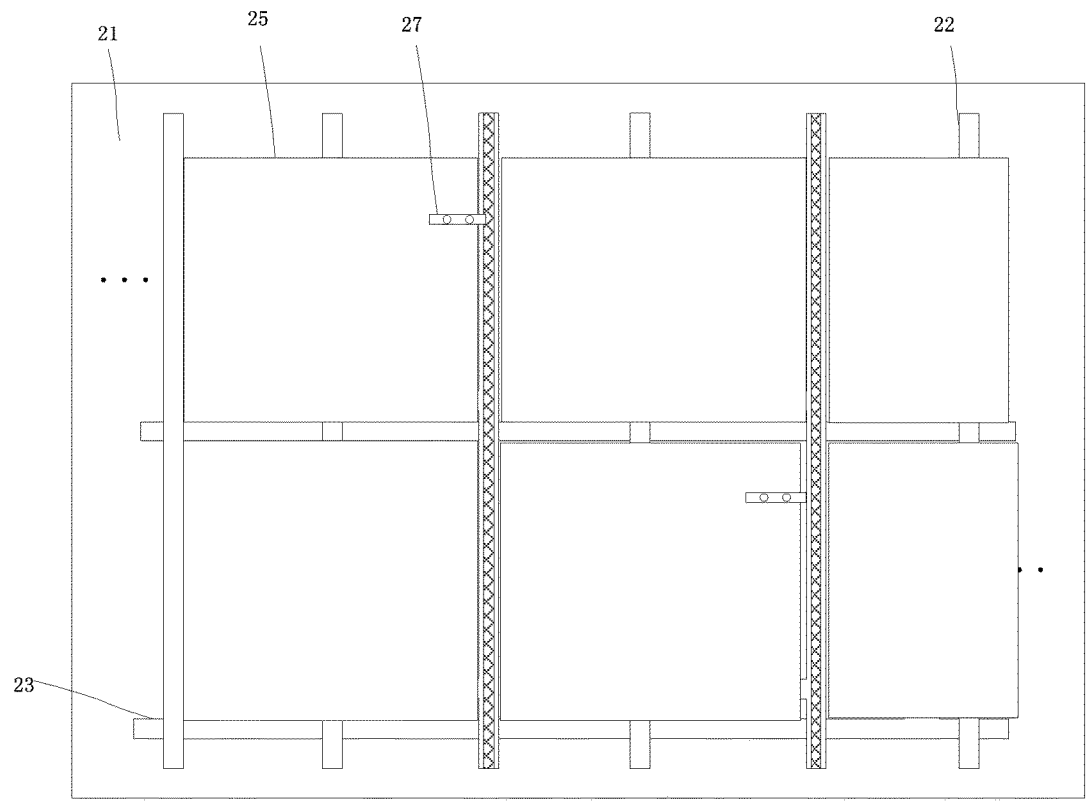
FIG. 2B is a schematic diagram showing the distribution of touch sensing electrodes of the array substrate, according to embodiments of the disclosure.

With reference to both FIGS. 2A and 2B, embodiment of the disclosure provide an array substrate.

As shown in FIG. 2A, the array substrate includes: a substrate 21; a plurality of scan lines 22 and a plurality of data lines 23 disposed on the substrate 21; and a plurality of sub-pixels 24 arranged in an array, which are defined by the scan lines 22 and the data lines 23 insulatedly intersecting the scan lines 22.

For example, to manufacture the array substrate, a metal layer is formed on the substrate 21 as a first metal layer (for example, the metal layer is made of aluminum, copper or molybdenum), and the plurality of scan lines 22 are formed by patterning the first metal layer; then an insulation layer (for example, which is made of silicon nitride and/or silicon oxide) is formed on the array substrate on which the scan lines 22 are already formed, another metal layer is formed on the insulation layer as a second metal layer, and the plurality of data lines 23 are formed by patterning the second metal layer. The data lines 23 are extended along a first direction, the scan lines 22 are extended along a second direction intersecting the first direction, and the scan lines 22 are electrically insulated from the data lines 23 by the insulation layer, so that the plurality of sub-pixels 24 arranged in an array are defined by insulatedly intersecting the scan lines 22 with the data lines 23.

Figure 2C:
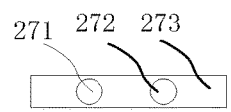
FIG. 2C is a top view showing a bridging structure of the array substrate, according to embodiments of the disclosure.
Figure 2D:
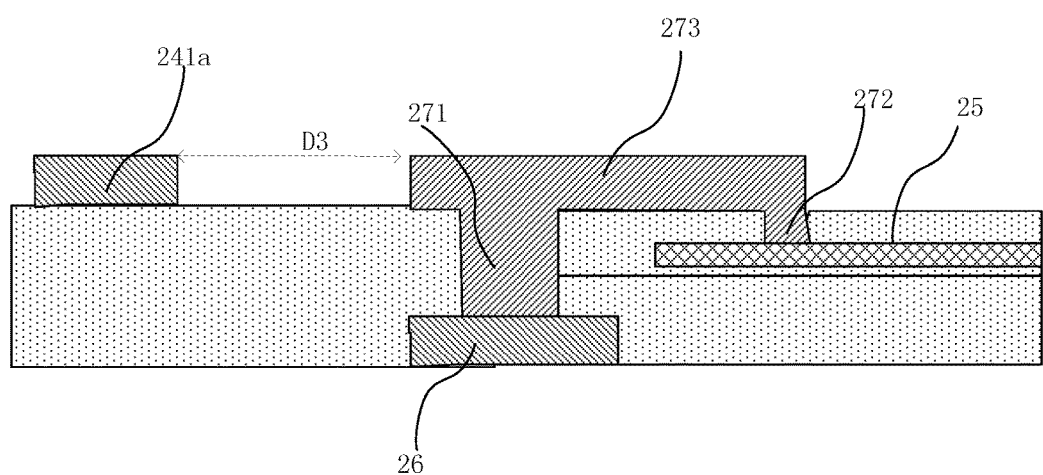
FIG. 2D is a cross-sectional view showing the bridging structure of the array substrate, according to embodiments of the disclosure.

Subsequently, a first transparent electrode layer made of a transparent conductive material such as Indium Tin Oxide (ITO) is formed on the data lines 23 to constitute a common electrode 28, as indicated by dashed blocks in FIG. 2A. The common electrode 28 is divided by using an etching process, for example, into unit blocks having the same size. When the array substrate operates in a display phase, the unit blocks operate as touch sensing electrodes 25 arranged in an array, as shown in FIG. 2B, and each touch sensing electrode 25 corresponds to one pixel region including a plurality of first sub-pixels 241 and at least one second sub-pixel 242, where an area of a second sub-pixel electrode 242a in the second sub-pixel 242 is smaller than that of a first sub-pixel electrode 241a in the first sub-pixel 241, and the second sub-pixel 242 is provided with a first inactive display region 242b. As shown in FIG. 2A, the first direction is a vertical direction, and the second direction is a horizontal direction; a width of the first sub-pixel electrode 241a is approximately identical to that of the second sub-pixel electrode 242a in the horizontal direction, and a length of the first sub-pixel electrode 241a is larger than that of the second sub-pixel electrode 242a in the vertical direction, so that the first inactive display region 242b is formed from an end part of the second sub-pixel electrode 242a and the scan line adjacent to the second sub-pixel 242, as indicated by the dashed ellipse shown in FIG. 2A; in this case, the second sub-pixel electrode 242a and a second thin film transistor (TFT) are not provided in the first inactive display region 242b. The array substrate further includes a plurality of first signal lines 26 extending along the first direction and connected respectively with the touch sensing electrodes 25, and the first signal lines 26 are below the touch sensing electrodes 25 and insulated from the touch sensing electrodes 25 by an insulation layer. Since the first signal lines 26 are located at a layer different from the touch sensing electrodes 25, first bridging structures 27 are provided to electrically connect the first signal lines 26 with the touch sensing electrodes 25. As shown in FIGS. 2C and 2D, which respectively show a top view and a cross-sectional view of the first bridging structure 27 when the first signal lines 26 are below the touch sensing electrodes 25, the first bridging structure 27 includes at least a first via hole 272 exposing the touch sensing electrode 25, a second via hole 271 exposing the first signal line 26 and a first connection wiring 273 for connecting the touch sensing electrode 25 with the first signal line 26. The first connection wiring 273 is extended along the second direction. In some embodiments, for example, the first connection wiring 273 is extended along the horizontal direction. Alternatively, the first signal lines 26 are above the touch sensing electrodes 25, in this case, the top view and the cross-sectional view of the first bridging structure 27 are similar to those shown in FIGS. 2C and 2D, which is not repeatedly discussed herein.

In the case that the first signal lines 26 are above the data lines 23, in manufacturing, an insulation layer is formed above the data lines 23, and then a third metal layer is formed above the insulation layer and patterned to form the first signal lines 26.

In embodiments of the disclosure, in order to increase a distance between the bridging structure and the pixel electrode so as to ensure good electrical insulation between the bridging structure and the pixel electrode adjacent to the bridging structure and reduce a probability of short circuit, the first bridging structure 27 is disposed in the first inactive display region 242b. The first bridging structure 27 is disposed at the same layer as and made of the same material as the first sub-pixel electrode 241a and the second sub-pixel electrode 242a, and the first connection wiring 273 of the first bridging structure 27 is spaced from the end of the second sub-pixel electrode 242a by a first preset distance D1. As FIGS. 2A and 2E, the first preset distance D1 between the first connection wiring 273 and the second sub-pixel electrode 242a in the first direction is larger than 1.5 μm and smaller than a half of the length of the first sub-pixel in the first direction, depending on a specific area of each sub-pixel. For example, in the case of the array substrate in a display panel with a high resolution, the first preset distance D1 is generally 1.5 μm to 15 μm. The first preset distance D1 is ideally 3 μm to 10 μm. For the array substrate in an array panel with an even higher resolution, the first preset distance D1 is 2 μm to 5 μm.

As shown in FIGS. 2A and 2D, the first connection wiring 273 of the first bridging structure 27 is spaced from the first sub-pixel electrode 241a adjacent to the first connection wiring 273 in the second direction by a third preset distance D3 in the second direction, in order to avoid the short circuit between the first connection wiring 273 and the adjacent first sub-pixel electrode 241a which are arranged at the same layer. The third preset distance D3 is larger than 1.5 μm and smaller than a half of the length of the first sub-pixel 241a in the first direction, depending on a specific area of each sub-pixel. For example, in the case of the array substrate in a display panel with a high resolution, the third preset distance D3 is generally 1.5 μm to 15 μm. The third preset distance D3 is ideally 3 μm to 8 μm. For the array substrate in an array panel with an even higher resolution, the first preset distance D1 is 2 μm to 4 μm.

In manufacturing the array substrate, an insulation layer (for example, which is made of silicon nitride or silicon oxide) or a passivation layer (for example, which is made of silicon nitride) is formed above the first signal lines 26, and a second transparent electrode layer (e.g. an ITO layer) is formed above the insulation layer or the passivation layer and etched to form the first sub-pixel electrodes 241a, the second sub-pixel electrodes 242a and the first connection wirings 273 by using the patterning process, where the first preset distance D1 is present between the first connection wiring 273 and an adjacent end of the second sub-pixel electrode 242a, and is sufficient to ensure the insulation between the first connection wiring 273 and the second sub-pixel electrode 242a, to reduce the probability of short circuit and improve yield. Further, the third preset distance D3 in the second direction is present between the first connection wiring 273 of the first bridging structure 27 and the first sub-pixel electrode 241a adjacent to the first connection wiring 273 in the second direction.

Figure 2E:
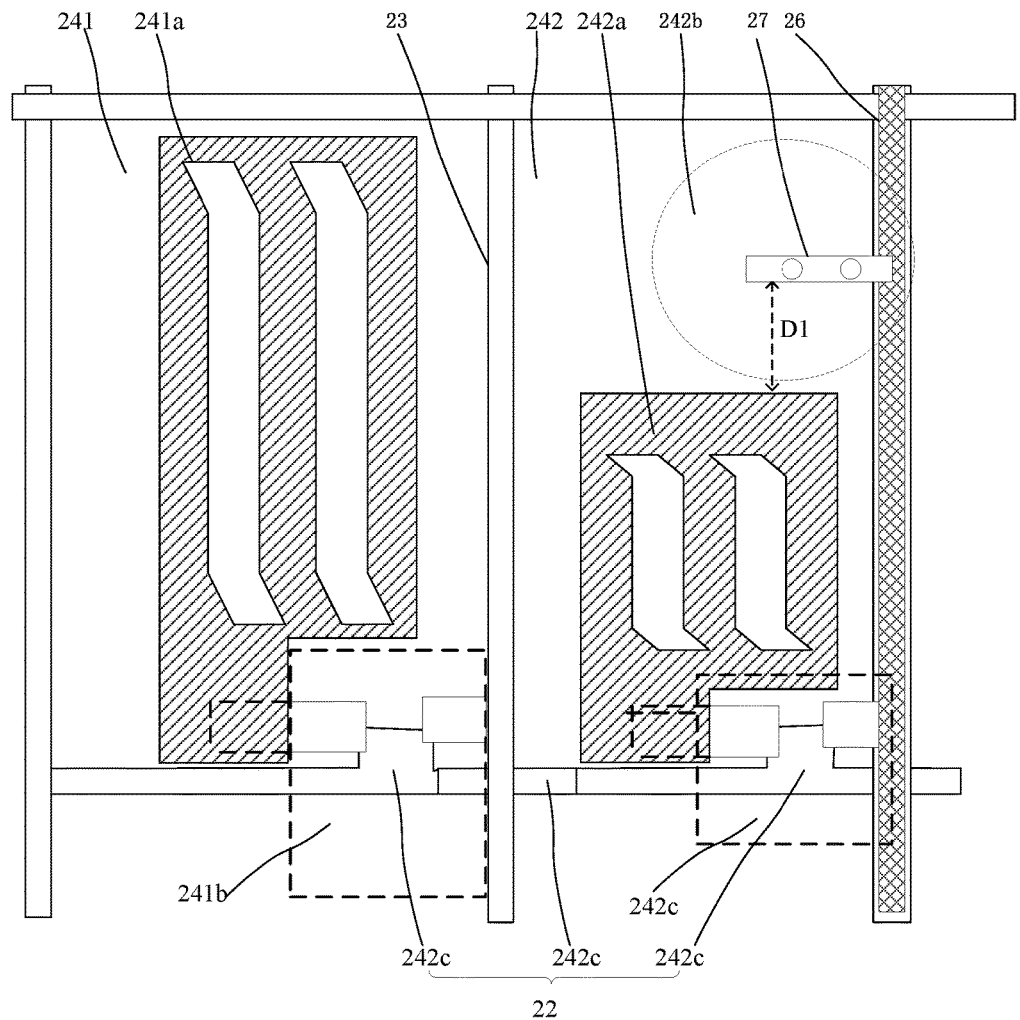
FIG. 2E is an enlarged schematic diagram showing the structure of a TFT device of the array substrate, according to embodiments of the disclosure.

With reference to the above embodiments, as shown in FIG. 2E, the scan lines 22 are extended straight forward in the second direction, and each includes a first gate electrode 241b1 of a first TFT 241b (as indicated by the left dashed block shown in FIG. 2E) in the first sub-pixel 241, a second gate electrode 242c1 of a second TFT 242c (as indicated by the right dashed block shown in FIG. 2E) in the second sub-pixel 242 adjacent to the first sub-pixel 241 in the second direction, and a second connection wiring 29 connecting the first gate electrode 241b1 and the second gate electrode 241c1. In manufacturing the array substrate, after forming the first metal layer on the substrate 21, the first metal layer is etched to form the first gate electrode 241b1, the second gate electrode 242c1 and the second connection wiring 29 by using the patterning processes to form a pattern of the scan lines 22.

In order to avoid display effect degradation (such as a non-uniform display effect) due to arrangement of a plurality of the inactive display regions 242b along a straight line, at least three first inactive display regions 242b are misaligned in the present disclosure. In other words, connecting center points of a plurality of the first inactive display regions in sequence results in a polygonal line instead of a straight line. Therefore, at least three first bridging structures are misaligned because each first bridging structure is disposed in the first inactive display region, otherwise, if a plurality of the first bridging structures are distributed in a straight line, the display effect is degraded, causing for example a non-uniform display effect and a lowered display quality, because an effective display area of the second sub-pixel is smaller than that of the first sub-pixel adjacent to the second sub-pixel due to the presence of the first bridging structure.

In the disclosure, the first sub-pixel and the second sub-pixel are different from each other and provided in the array substrate, where the area of the second sub-pixel electrode in the second sub-pixel is smaller than that of the first sub-pixel electrode in the first sub-pixel, the first inactive display region is provided in the second sub-pixel (which includes the second sub-pixel electrode having a smaller area), and the first bridging structure for electrically connecting the touch sensing electrode with the first signal line is provided within the first inactive display region. In this way, the space between the bridging structure and the pixel electrodes is increased, which reduces the probability of short circuit, thereby achieving a higher solution of the display panel.

Figure 3A:
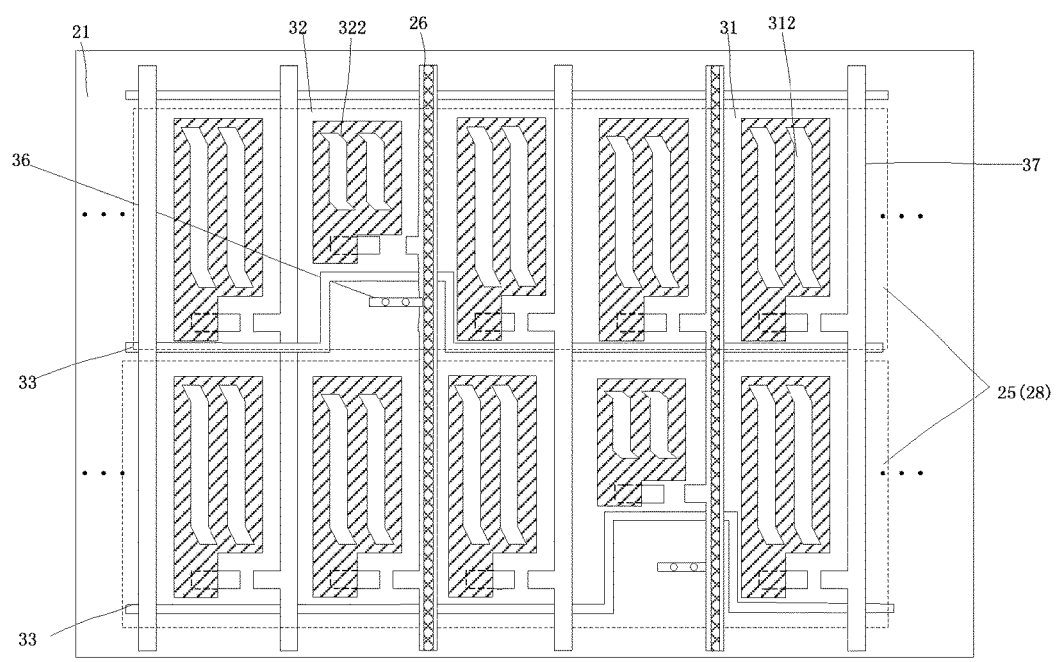
FIG. 3A is a schematic diagram showing the structure of an array substrate, according to embodiments of the disclosure.

As shown in FIG. 3A, embodiments include another implementation of the structure of the array substrate, based on the embodiments described above. In some embodiments, the scan line 33 has a bent structure, and a first bridging structure 36 is located within the second sub-pixel 32. The first bridging structure 36 is disposed at the same layer as the second pixel electrode 322 and at the same plane as the second pixel electrode 322, and the first bridging structure 36 is below the second pixel electrode 322 in the second direction, i.e. the vertical direction.

Figure 3B:
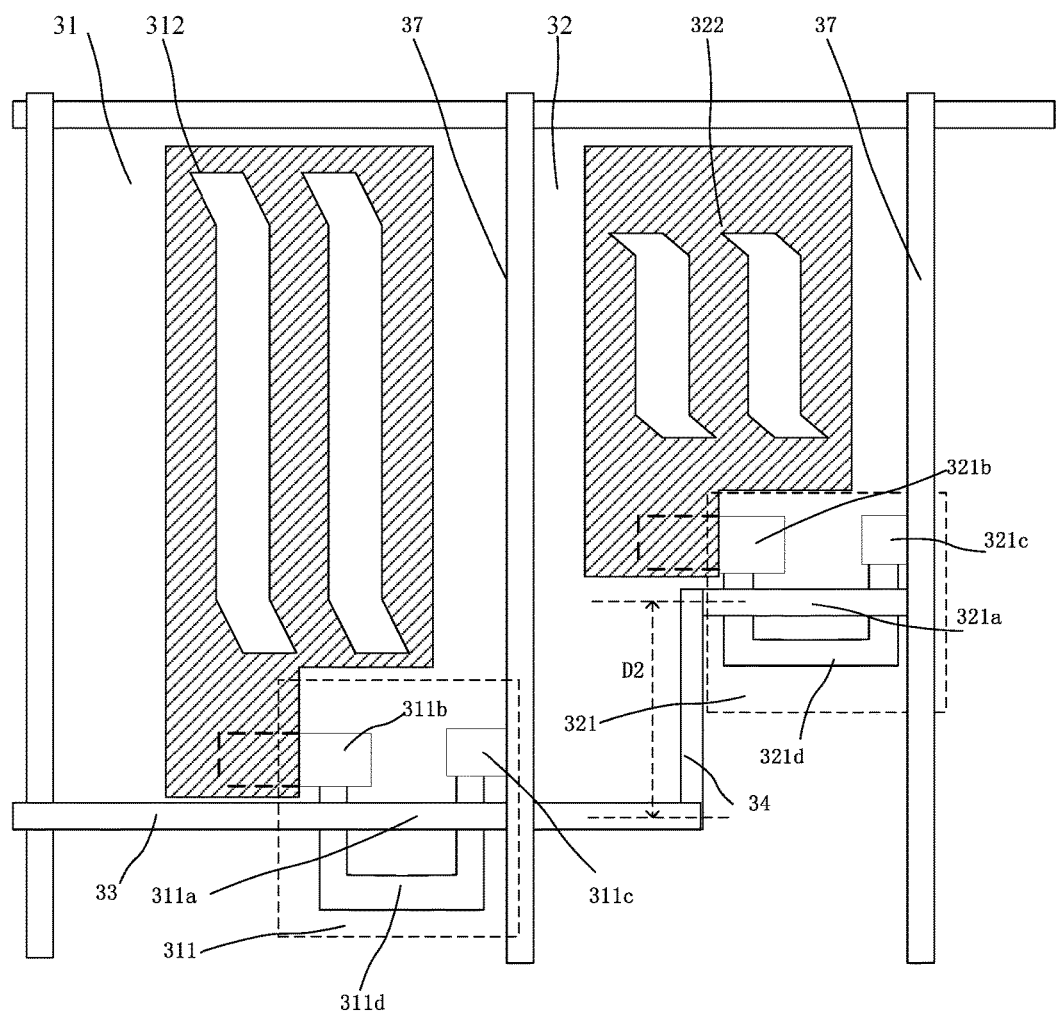
FIG. 3B is an enlarged schematic diagram showing the structure of a TFT device of the array substrate, according to embodiments of the disclosure.

As shown in FIG. 3B, the first sub-pixel 31 and the second sub-pixel 32 adjacent to each other in the second direction include a first TFT 311 and a second TFT 321, respectively. The first TFT 311 includes a first gate electrode 311a directly connected with a scan line 33, and the first gate electrode 311a and the scan line 33 can be obtained by patterning the same metal layer. The second TFT 321 includes a second gate electrode 321a, which is spaced from the first gate electrode 311a by a second distance D2 in the first direction, and the first gate electrode 311a and the second gate electrode 321a are electrically connected with each other by a second connection wiring 34 extending in the first direction. In some embodiments, in manufacturing the array substrate, the first gate electrode 311a, the second gate electrode 321a, the second connection wiring 34 and the scan line 34 are obtained by patterning the same metal layer, and are directly connected with each other and electrically connected. Additionally, the second preset distance D2 is 3 μm to 15 μm and can vary with a specific area of each sub-pixel. For the array substrate in a display panel with a high resolution, the second preset distance D2 is ideally 3 μm to 8 μm. For the array substrate in an array panel with an even higher resolution, the second preset distance D2 is 2 μm to 5 μm.

Figure 3C:
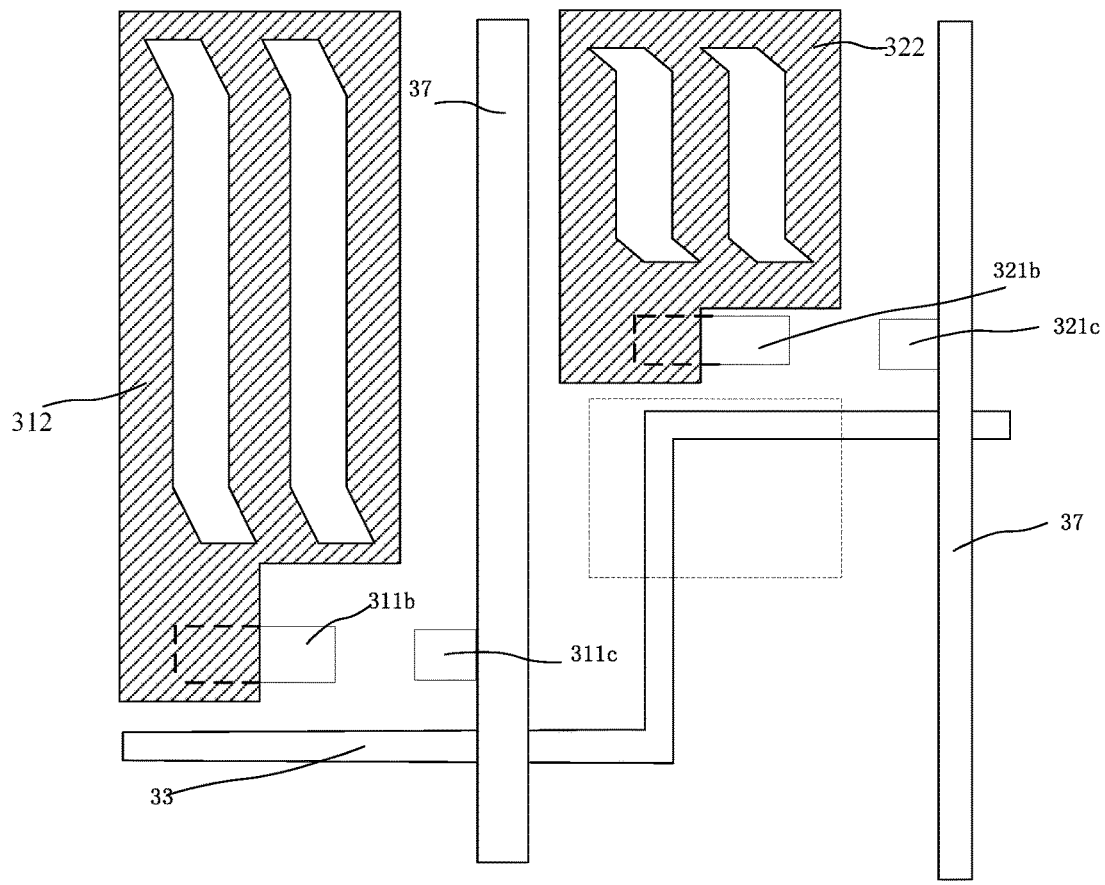
FIG. 3C is a schematic diagram showing the structure of scanning lines of the array substrate, according to embodiments of the disclosure.
Figure 3D:
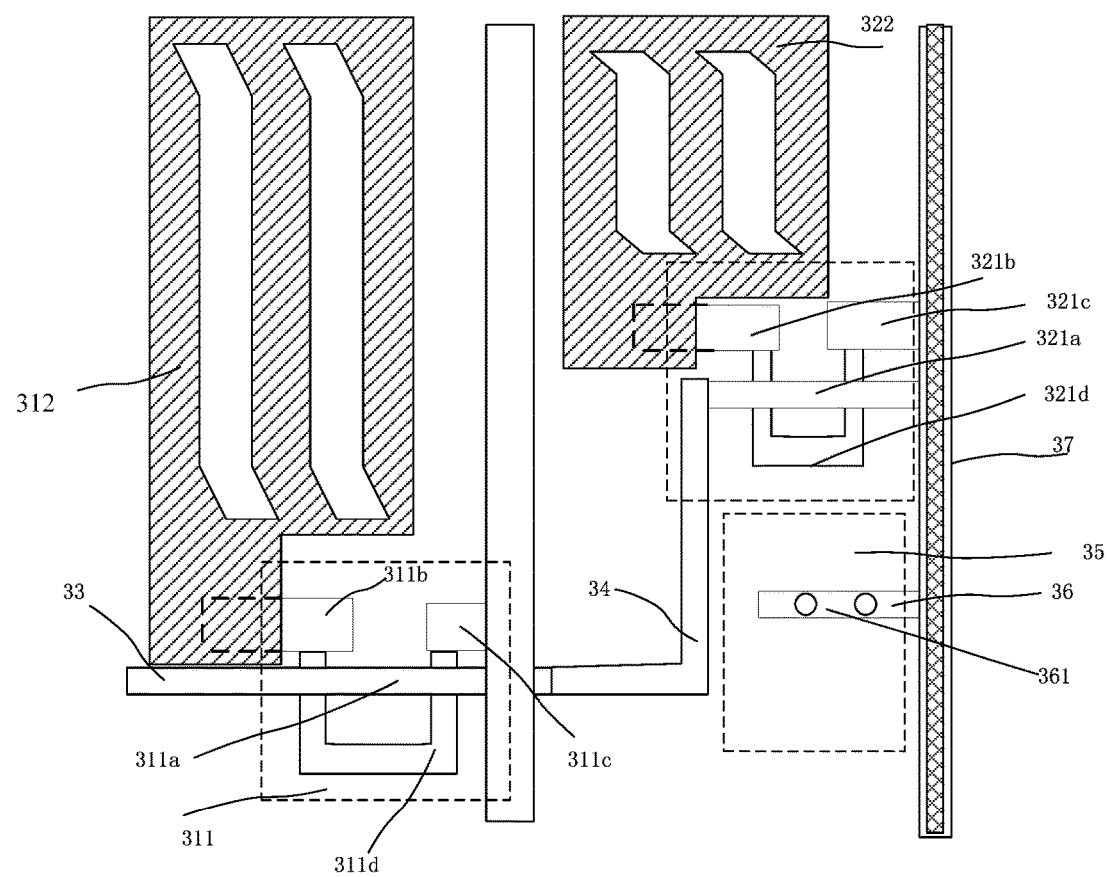
FIG. 3D is a schematic diagram showing the position of a first inactive display region in the array substrate, according to embodiments of the disclosure.

In the present disclosure, to increase a distance between the bridging structure and the pixel electrode so as to ensure electrical insulation between the bridging structure and the pixel electrode adjacent to the bridging structure and reduce a probability of short circuit there between, the manufactured scan line 33 has a bent structure within the region of the second sub-pixel 32, as indicated by a dashed block shown in FIG. 3C. In this case, the scan line 33 includes the first gate electrode 311a, the second gate electrode 321a and the second connection wiring 34. Thus, a first inactive display region 35 is defined by intersecting the second gate electrode 321a with the second connection wiring 34 within the region of the second sub-pixel 32, as indicated by a dashed block shown in FIG. 3D. The first bridging structure 36 is disposed within the first inactive display region 35, and a width of a first connection wiring 361 of the first bridging structure 36 in the first direct is smaller than the second preset distance D2 between the first gate electrode 311a and the second gate electrode 321a.

Additionally, the first TFT 311 further includes a first drain electrode 311b electrically connected with the first sub-pixel electrode 312, a first source electrode 311c electrically connected with a data line 37, and polycrystalline silicon layer 311d. Similarly, the second TFT 321 also includes a second drain electrode 321b electrically connected with the second sub-pixel electrode 322, a second source electrode 321c electrically connected with a data line 37, and polycrystalline silicon layer 321d.

Also, in the present disclosure, the first sub-pixel and the second sub-pixel are different from each other and provided in the array substrate, where the area of the second sub-pixel electrode in the second sub-pixel is smaller than that of the first sub-pixel electrode in the first sub-pixel, the first inactive display region is arranged in the second sub-pixel (which includes the second sub-pixel electrode having a smaller area), i.e., the TFT in the second sub-pixel is relatively moved upwards so that the inactive display region is formed, and then the first bridging structure, which electrically connects the touch sensing electrode with the first signal line, is arranged within the first inactive display region. The embodiments can increase the space between the bridging structure and the pixel electrode, which reduces the probability of short circuit, thereby achieving a higher solution of the display panel.

Figure 4:
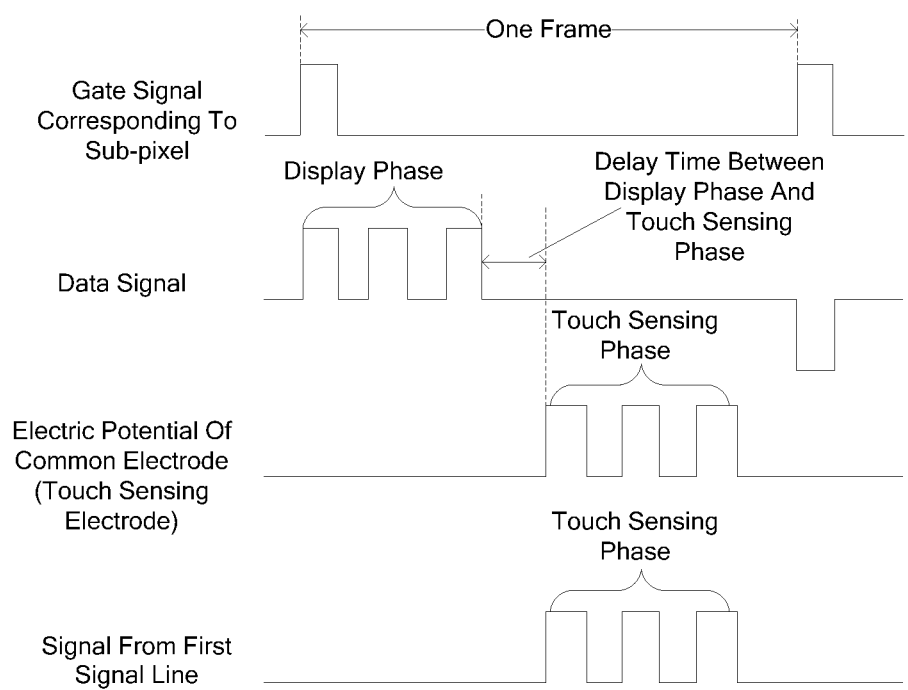
FIG. 4 is an operation timing diagram of processing signal data within one frame by the array substrate of any of the embodiments described above, according to embodiments described in the disclosure.

FIG. 4 is an operation timing diagram of processing signal data within one frame by the array substrate. Here, the TFT in each sub-pixel of the array substrate has an N-channel semiconductor (N-type) structure. In the beginning of the display phase, a gate electrode of each TFT is connected to a high electric potential (such as about 5V), the common electrode and all the first signal lines are connected to a low electric potential (such as 0V or −5V), and the touch mode is inactivated, then data signals are applied to the source electrodes of the TFTs by the data lines. During the display phase (which lasts for about 10 mm), the gate electrodes of the TFTs, the common electrode and the first signal lines all are connected to a low electric potential, so that the data signals are transmitted to the pixel electrodes, thereby controlling the display device to display the signals, meanwhile a plurality of the touch sensing electrodes are connected to the same electric potential.

In a touch sensing phase (which lasts for about 5 mm), the common electrode operates as touch sensing electrodes, each of which is connected to corresponding one of the first signal lines, where the first signal lines are configured to send touch signals (such as, pulse signals having a high level lasting for about 5 ns) to the touch sensing electrodes, and receive signals fed back by the touch sensing electrodes, thereby detecting a user touch operation and determining a touch position. There is a certain delay time between the display phase and the touch sensing phase.

The disclosure further provides a display panel, including the array substrate described above.

Figure 5:
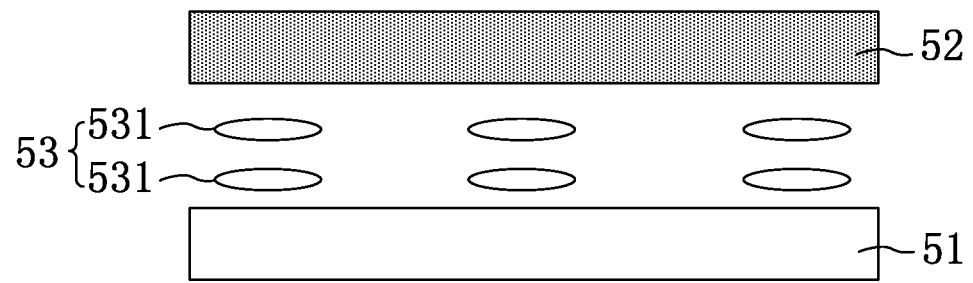
FIG. 5 is a sectional diagram showing the structure of a display panel, according to embodiments of the disclosure.

In some embodiments, the display panel is a Fringe Field Switching (FFS) mode display panel or an In-Plane Switching (IPS) mode display panel. As shown in FIG. 5, the display panel includes the array substrate 51 described above, and further includes a color filter substrate 52, and a liquid crystal layer 53 sandwiched between the color filter substrate 52 and the array substrate 51. The liquid crystal layer 53 includes liquid crystal molecules 531, which may be positive or negative liquid crystal molecules.

It is noted that the display panel described above has a touch sensing function. The technical principles employed and the technical effects achieved by the display panel are like those achieved by the above-described array substrate, which is not repeatedly discussed herein.

The present disclosure further provides a display device, including the display panel described above.

Figure 6:
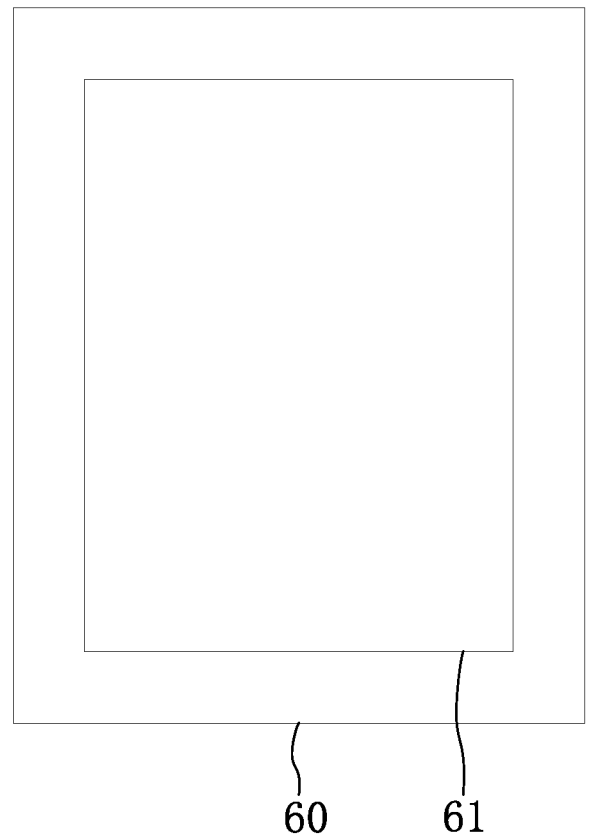
FIG. 6 is a schematic diagram showing the structure of a display device, according to embodiments of the disclosure.

As shown in FIG. 6, the display device 60 includes the above-described display panel 61, and further includes other elements for supporting the display panel 61 to work properly. The display panel 61 may be the display panel described in any of the above embodiments. The display device 60 may be a cellphone, a desktop computer, a laptop computer, a tablet computer, an electronic photo frame, electronic paper and so on.

Figure 7:
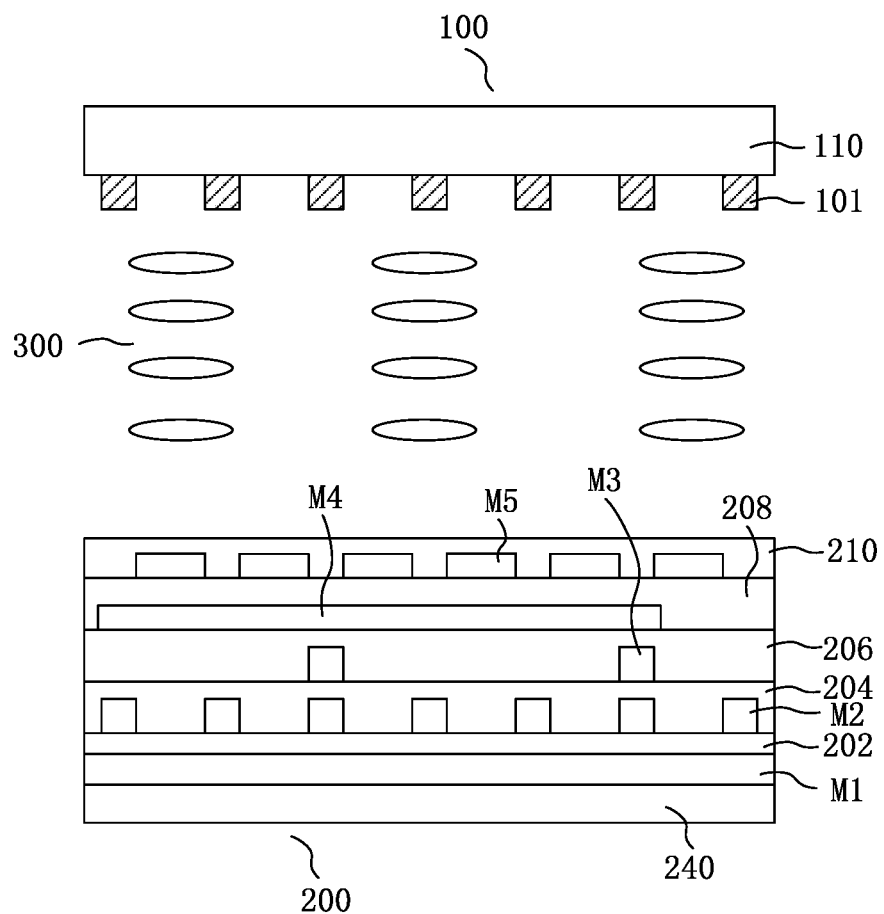
FIG. 7 is a cross-sectional view of a display panel, according to embodiments of the disclosure.
Figure 8:
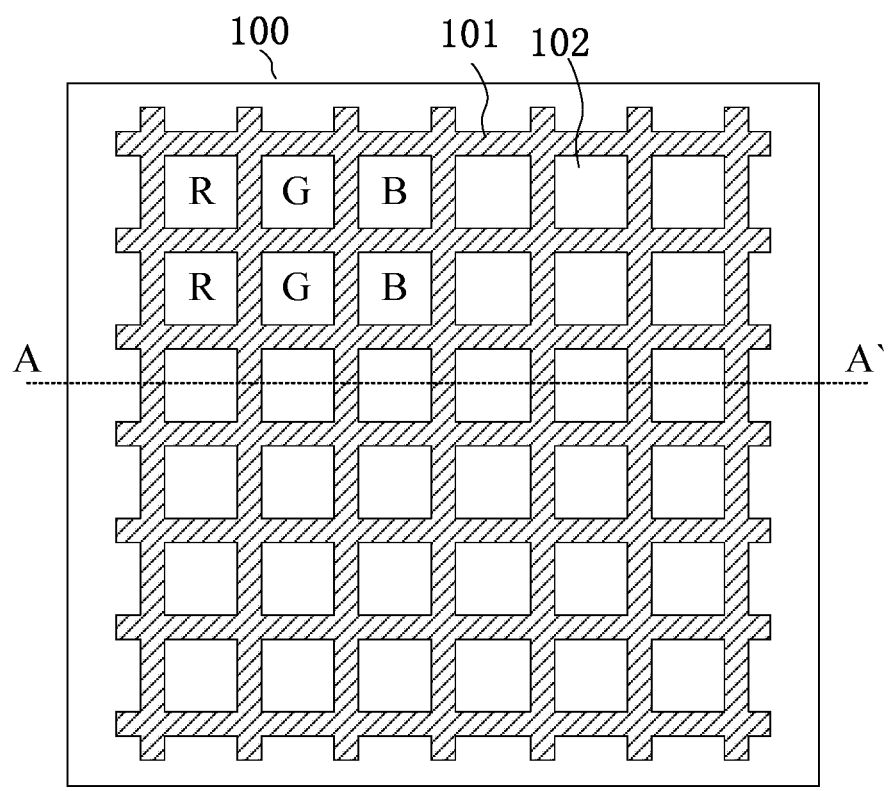
FIG. 8 is a plan view of a color film substrate, according to embodiments of the disclosure.

FIG. 7 is a cross-sectional view of a display panel, according to embodiments of the disclosure. FIG. 8 is a plan view of a color film substrate, according to embodiments of the disclosure. FIG. 7 is a cross-sectional view taken along a line A-A in FIG. 8.

As shown in FIG. 7, the display panel includes a color filter substrate 100, an array substrate 200 and a liquid crystal layer 300 disposed between the color filter substrate 100 and the array substrate 200.

The color filter substrate 100 includes a glass substrate (or transparent resin substrate) 110. The glass substrate 110 has a first surface and a second surface. The first surface of the glass substrate 110 is provided with a polarizer. The second surface of the glass substrate 110 is provided with a black matrix 101. The black matrix 101 is made from an opaque material (such as Chromium or acrylic resin added with black pigment). With reference to FIG. 8, a plurality of light-transmissive regions 102 arranged in a matrix are defined by the black matrix 101. Each light-transmissive region 102 is provided with a corresponding color filter. In embodiments, the color filters include red color filters R, green color filters G and blue color filters B.

The array substrate 200 includes a glass substrate (or transparent resin substrate) 240. The glass substrate 240 has a first surface and a second surface.

Figure 9:
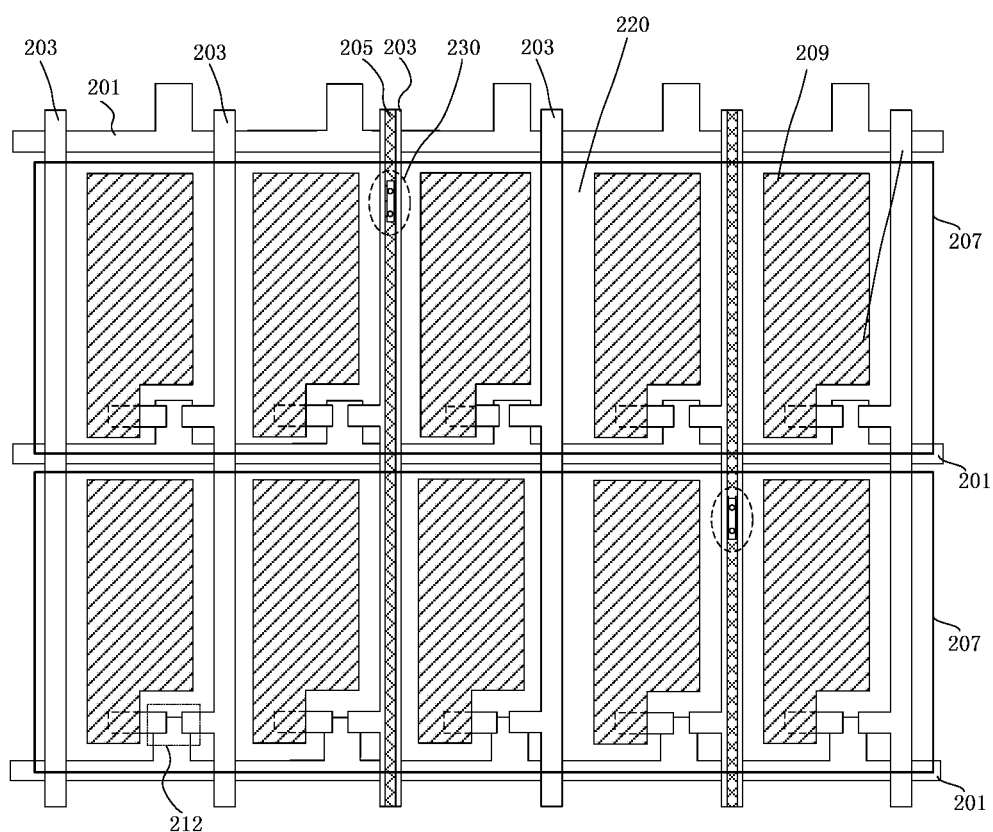
FIG. 9 is a plan view of an array substrate, according to embodiments of the disclosure.

With reference to FIGS. 7 and 9, the first surface of the glass substrate 240 is provided with a polarizer. The second surface of the glass substrate 240 is provided with a first metal layer M1. Optionally, the first metal layer M1 is patterned to form gate lines 201. Optionally, other function layers may be provided between the first metal layer M1 and the second surface of the glass substrate 240.

A first insulating layer 202 is provided on the first metal layer M1. The material of the first insulating layer 202 is, for example, silicon dioxide, silicon nitride, or resin. A second metal layer M2 is provided on the first insulating layer 202. Optionally, the second metal layer M2 is patterned to form data lines 203.

The second metal layer M2 is covered by a second insulating layer 204, and a third metal layer M3 is disposed on the second insulating layer 204. Optionally, the second insulating layer 204 is an organic film. Optionally, the third metal layer M3 is patterned to form first signal lines 205.

The third metal layer M3 is covered by a third insulating layer 206. A fourth metal layer M4 is disposed on the third insulating layer 206. The fourth metal layer M4 is covered by a fourth insulating layer 208. A fifth metal layer M5 is disposed on the fourth insulating layer 208. The fifth metal layer M5 is covered by a protection layer 210.

Optionally, both the fourth metal layer M4 and the fifth metal layer M5 are ITO (Indium Tin Oxide) layers.

In embodiments, the fourth metal layer M4 is patterned to form a plurality of common electrodes 207, and the fifth metal layer M5 is patterned to form a plurality of pixel electrodes 209. The plurality of common electrodes 207 are arranged in a matrix. Each common electrode 207 is connected to a first signal source via a corresponding first signal line 205. Optionally, each of the common electrodes 207 is arranged in one-to-one correspondence with a respective one of the first signal lines 205, and each first signal line 205 is electrically connected to only one corresponding common electrode 207. When the display panel displays an image, a common electrode signal is provided from the first signal source to the common electrodes 207 via the first signal lines 205. When a user performs a touch operation on the display panel, a touch driving signal is provided from the first signal source to the common electrodes 207 via the first signal lines 205, and the first signal source receives a touch sensing signal.

FIG. 9 is a plan view of an array substrate, according to embodiments of the disclosure. As shown in FIG. 9, the plurality of gate lines 201 extend in a first direction, the plurality of data lines 203 extend in a second direction, and the first direction is substantially perpendicular to the second direction. A plurality of pixel regions 220 are defined by the plurality of gate lines 201 and the plurality of data lines 203. Each pixel region 220 corresponds to one light-transmissive region 102 of the color filter substrate 100 (that is, the projection of each pixel region 220 on the glass substrate 240 and the projection of the corresponding light-transmissive region 102 on the glass substrate 240 substantially coincide). The plurality of gate lines 201 and the plurality of data lines 203 are arranged in a position in correspondence with the black matrix 101 of the color filter substrate 100 (that is, projections of the plurality of gate lines 201 and the plurality of data lines 203 on the glass substrate 240 and the projection of the black matrix 101 on the glass substrate 240 substantially coincide).

Each pixel region 220 includes a thin film transistor 212 and the pixel electrode 209. A gate electrode of the thin film transistor 212 is electrically connected to a corresponding gate line 201, a source electrode of the thin film transistor 212 is electrically connected to a corresponding data line 203, and a drain electrode of the thin film transistor 212 is electrically connected to the pixel electrode 209.

Each common electrode 207 covers several pixel regions 220. In embodiments, each common electrode 207 covers five pixel regions 220 arranged in the first direction. Optionally, each common electrode 207 covers an array of pixel regions 220 of m rows and n columns. The quantity of the first signal lines 205 is less than that of the data lines 203. Each first signal line 205 is disposed above a corresponding data line 203. Optionally, the projection of each first signal line 205 on the glass substrate 240 is within that of the corresponding data line 203 on the glass substrate 240. Optionally, the projection of the corresponding data line 203 on the glass substrate 240 is within that of the first signal line 205 on the glass substrate 240. Optionally, the first signal line 205 and the data line 203 have the same width. Each first signal line 205 is electrically connected to the corresponding common electrode 207 by a bridge structure.

Figure 10:
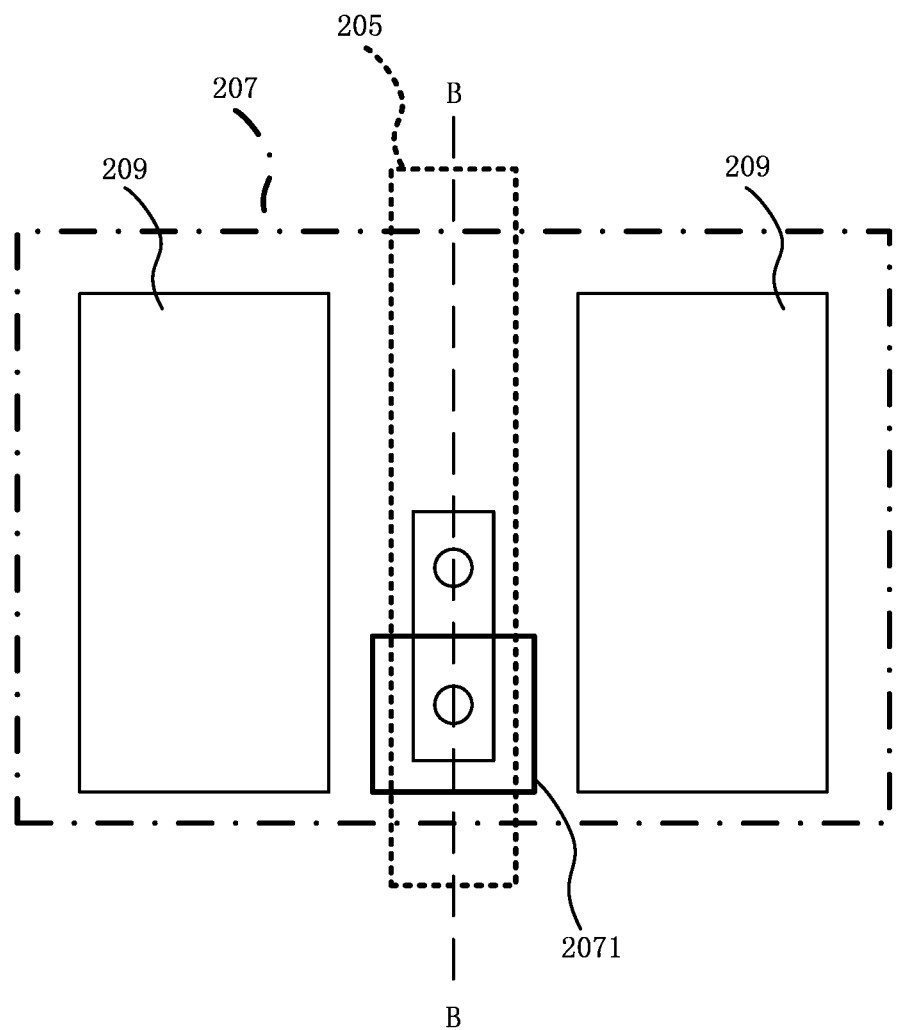
FIG. 10 is a structural diagram of a bridge structure region, according to embodiments of the disclosure.
Figure 11:
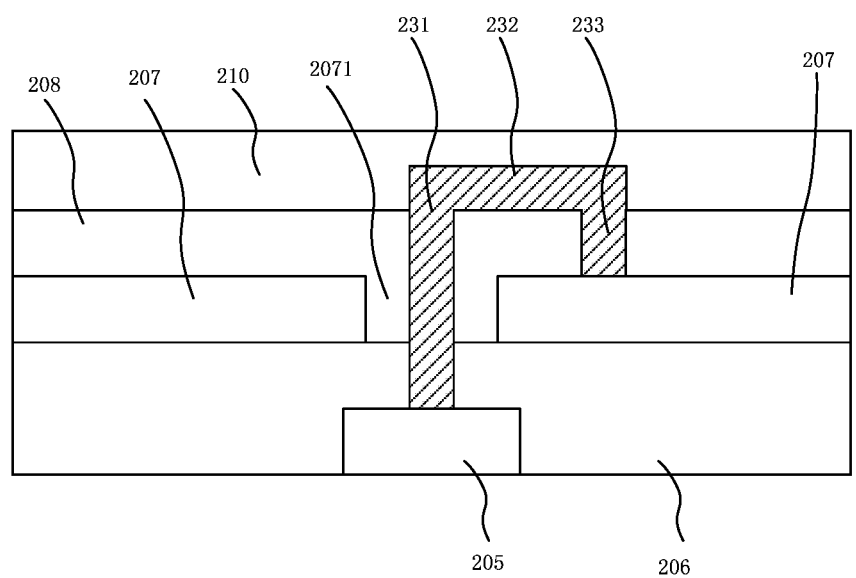
FIG. 11 is a sectional view of the bridge structure region, according to embodiments of the disclosure.

FIG. 10 is a structural diagram of the bridge structure region 230 in FIG. 9. FIG. 11 is a sectional view of the bridge structure region 230 taken along a line B-B. The common electrode 207 is provided with a through hole 2071. The bridge structure includes a first part 231, a second part 232 and a third part 233. The second part 232 is disposed at the fifth metal layer M5, that is, the second part 232 and the pixel electrode 209 are at the same layer. The first part 231 of the bridge structure runs through the fourth insulating layer 208, the through hole 2071 and the third insulating layer 206 and is further brought into contact with the first signal line 205 so as to achieve the electrical connection. The third part 233 of the bridge structure runs through the fourth insulating layer 208 and is brought into contact with the common electrode 207 so as to achieve the electrical connection. The first part 231 of the bridge structure is substantially perpendicular to the second part 232 of the bridge structure, and the third part 233 is substantially perpendicular to the second part 232. The first part 231 and the third part 233 are substantially perpendicular to the glass substrate 240. That is, the first part 231 and the third part 233 extend in a third direction that is perpendicular to the glass substrate 240 (that is, perpendicular to the array substrate 200). The third direction is perpendicular to a plane defined by the first direction and the second direction.

Optionally, during the process of fabricating the display panel, a metal layer is disposed on the fourth insulating layer 208 and then patterned by photolithography, etching and the like to form the pixel electrodes 209 and the second part 232 of the bridge structure simultaneously. Optionally, the material of the bridge structure is indium tin oxide.

Optionally, the material of the bridge structure is copper, cobalt, nickel, gold, silver, aluminum, platinum or an alloy thereof.

In embodiments, as shown in FIG. 9, the bridge structure is formed above the corresponding data line 203, the second part 232 of the bridge structure extends in the second direction. The projection of the second part 232 of the bridge structure on the glass substrate 240 is within the projection of the first signal line 205 on the glass substrate 240. Projections of the first part 231 and the third part 233 of the bridge structure on the glass substrate 240 are also within the projection of the first signal line 205 on the glass substrate 240. Therefore, the bridge structure is arranged in a region shielded by the black matrix 101 (that is, the projection of the bridge structure on the glass substrate 240 is within the projection of the black matrix 101 on the glass substrate 240), and the aperture ratio is increased.

Figure 12:
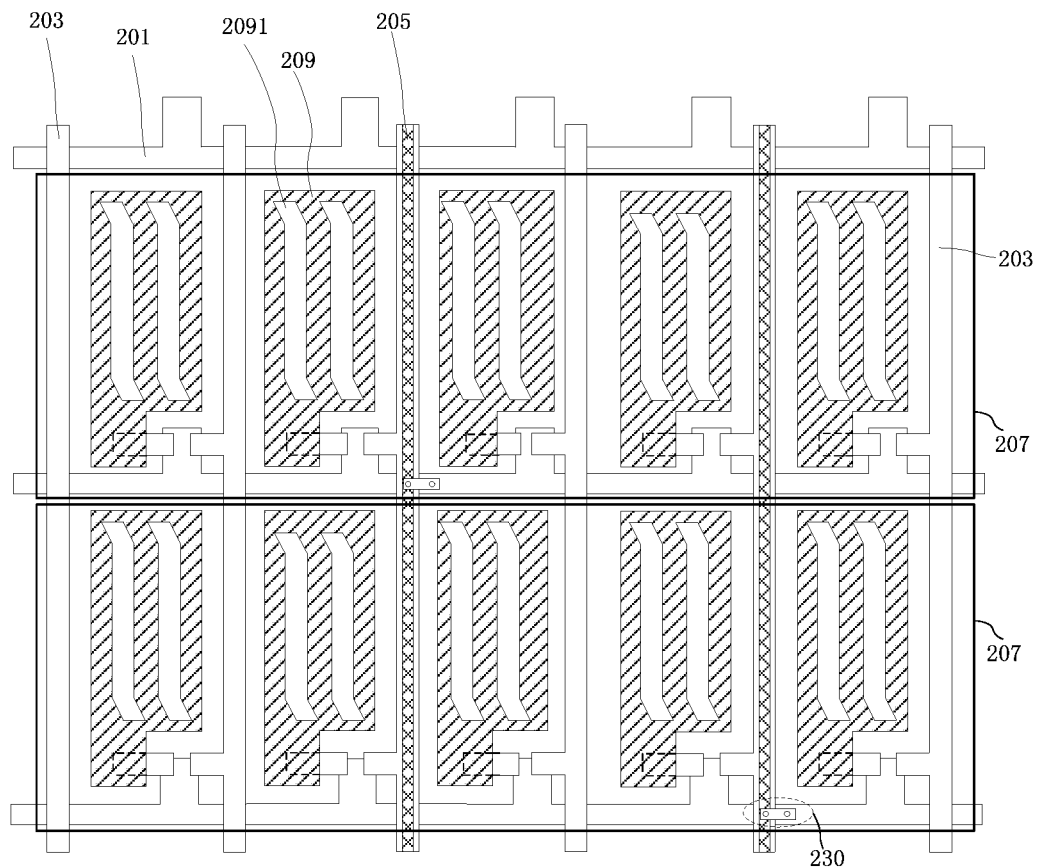
FIG. 12 is a plan view of an array substrate, according to embodiments of the disclosure.

FIG. 12 is a plan view of an array substrate, according to embodiments of the disclosure. As shown in FIG. 12, in embodiments, a plurality of gate lines 201 extend in a first direction, a plurality of data lines 203 extend in a second direction, and the first direction is substantially perpendicular to the second direction. A plurality of pixel regions are defined by the plurality of gate lines 201 and the plurality of data lines 203. Each pixel region corresponds to one light-transmissive region 102 of the color filter substrate 100. The plurality of gate lines 201 and the plurality of data lines 203 are arranged in a position in correspondence with the black matrix 101 of the color filter substrate 100. Each common electrode 207 covers five pixel regions arranged in the first direction. Each pixel region includes one pixel electrode 209 that has a slit 2091. The first signal line 205 is disposed above the corresponding data line 203. The first signal line 205 is electrically connected to the corresponding common electrode 207 via a bridge structure 230 that is disposed at an intersection region of the gate line 201 and the data line 203.

The common electrode 207 is provided with a through hole 2071. The bridge structure includes a first part 231, a second part 232 and a third part 233. The second part 232 is disposed at the fifth metal layer M5, that is, the second part 232 and the pixel electrode 209 are at the same layer. The first part 231 of the bridge structure runs through the fourth insulating layer 208, the through hole 2071 and the third insulating layer 206 and is further brought into contact with the first signal line 205 so as to achieve the electrical connection. The third part 233 of the bridge structure runs through the fourth insulating layer 208 and is brought into contact with the common electrode 207 so as to achieve the electrical connection. The first part 231 of the bridge structure is substantially perpendicular to the second part 232 of the bridge structure, and the third part 233 is also substantially perpendicular to the second part 232. The first part 231 and the third part 233 are substantially perpendicular to the glass substrate 240. That is, the first part 231 and the third part 233 extend in a third direction which is perpendicular to the glass substrate 240 (that is, perpendicular to the array substrate 200). The third direction is perpendicular to a plane defined by the first direction and the second direction.

The second part 232 of the bridge structure extends in the first direction. The projection of the second part 232 of the bridge structure on the glass substrate 240 is within the projection of the gate line 201 on the glass substrate 240. The projection of the first part 231 of the bridge structure on the glass substrate 240 is within the projection of the intersection region of the gate line 201 and the data line 203 on the glass substrate 240. The projection of the third part 233 of the bridge structure on the glass substrate 240 is within the projection of the gate line 201 on the glass substrate 240. Therefore, the bridge structure is arranged in a region shielded by the black matrix 101 (that is, the projection of the bridge structure on the glass substrate 240 is within the projection of the black matrix 101 on the glass substrate 240), and the aperture ratio is increased.

Figure 13:
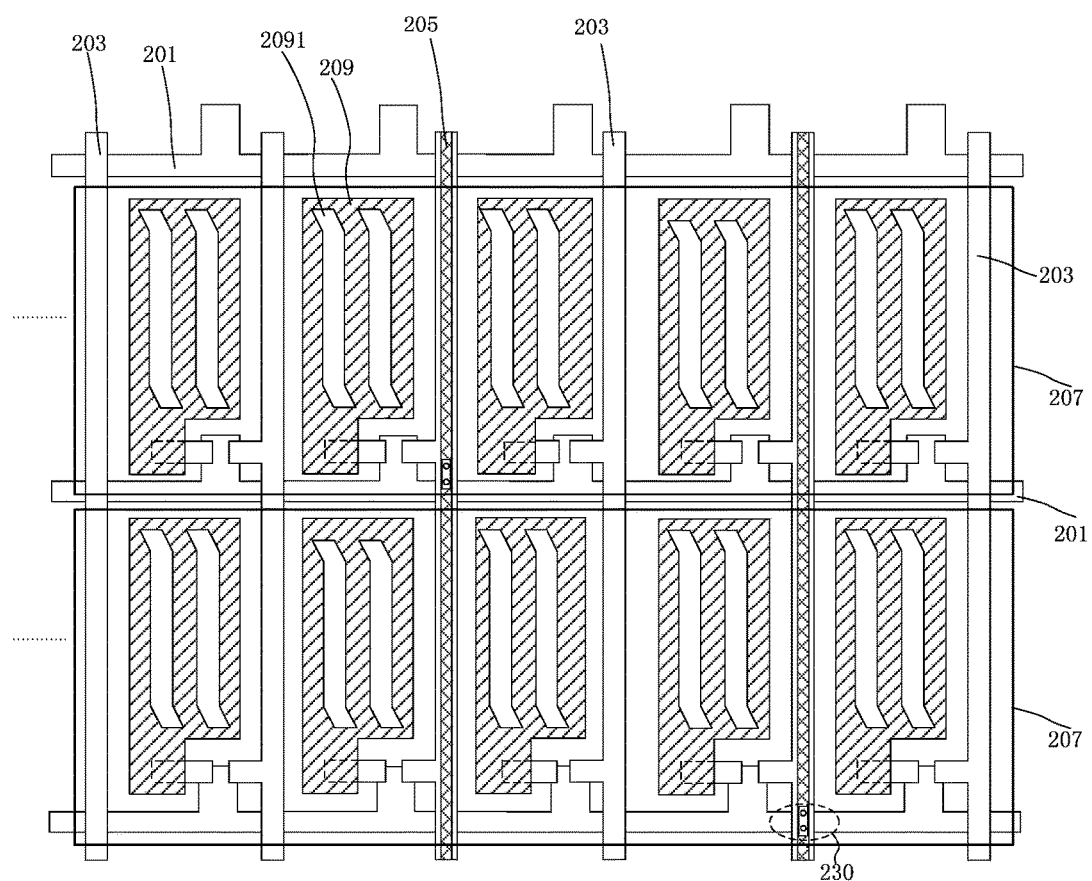
FIG. 13 is a plan view of an array substrate, according to embodiments of the disclosure.

FIG. 13 is a plan view of an array substrate, according to embodiments of the disclosure. As shown in FIG. 13, in embodiments, a plurality of gate lines 201 extend in a first direction, a plurality of data lines 203 extend in a second direction, and the first direction is substantially perpendicular to the second direction. A plurality of pixel regions are defined by the plurality of gate lines 201 and the plurality of data lines 203. Each pixel region corresponds to one light-transmissive region 102 of the color filter substrate 100. The plurality of gate lines 201 and the plurality of data lines 203 are arranged in a position in correspondence with the black matrix 101 of the color filter substrate 100. Each common electrode 207 covers five pixel regions arranged in the first direction. Each pixel region includes one pixel electrode 209 that has a slit 2091. The first signal line 205 is disposed above the corresponding data line 203. The first signal line 205 is electrically connected to the corresponding common electrode 207 via a bridge structure 230 that is disposed at an intersection region of the gate line 201 and the data line 203.

The common electrode 207 is provided with a through hole 2071. The bridge structure includes a first part 231, a second part 232 and a third part 233. The second part 232 is disposed at the fifth metal layer M5, that is, the second part 232 and the pixel electrode 209 are at the same layer. The first part 231 of the bridge structure runs through the fourth insulating layer 208, the through hole 2071 and the third insulating layer 206 and is further brought into contact with the first signal line 205 so as to achieve the electrical connection. The third part 233 of the bridge structure runs through the fourth insulating layer 208 and is brought into contact with the common electrode 207 so as to achieve the electrical connection. The first part 231 of the bridge structure is substantially perpendicular to the second part 232 of the bridge structure, and the third part 233 is also substantially perpendicular to the second part 232. The first part 231 and the third part 233 are substantially perpendicular to the glass substrate 240. That is, the first part 231 and the third part 233 extend in a third direction which is perpendicular to the glass substrate 240 (that is, perpendicular to the array substrate 200). The third direction is perpendicular to a plane defined by the first direction and the second direction.

The second part 232 of the bridge structure extends in the second direction. The projection of the second part 232 of the bridge structure on the glass substrate 240 is within the projection of the data line 203 on the glass substrate 240. The projection of the first part 231 of the bridge structure on the glass substrate 240 is within the projection of the intersection region of the gate line 201 and the data line 203 on the glass substrate 240. The projection of the third part 233 of the bridge structure on the glass substrate 240 is within the projection of the data line 203 on the glass substrate 240. Therefore, the bridge structure is arranged in a region shielded by the black matrix 101 (that is, the projection of the bridge structure on the glass substrate 240 is within the projection of the black matrix 101 on the glass substrate 240), and the aperture ratio is increased.

Figure 14:
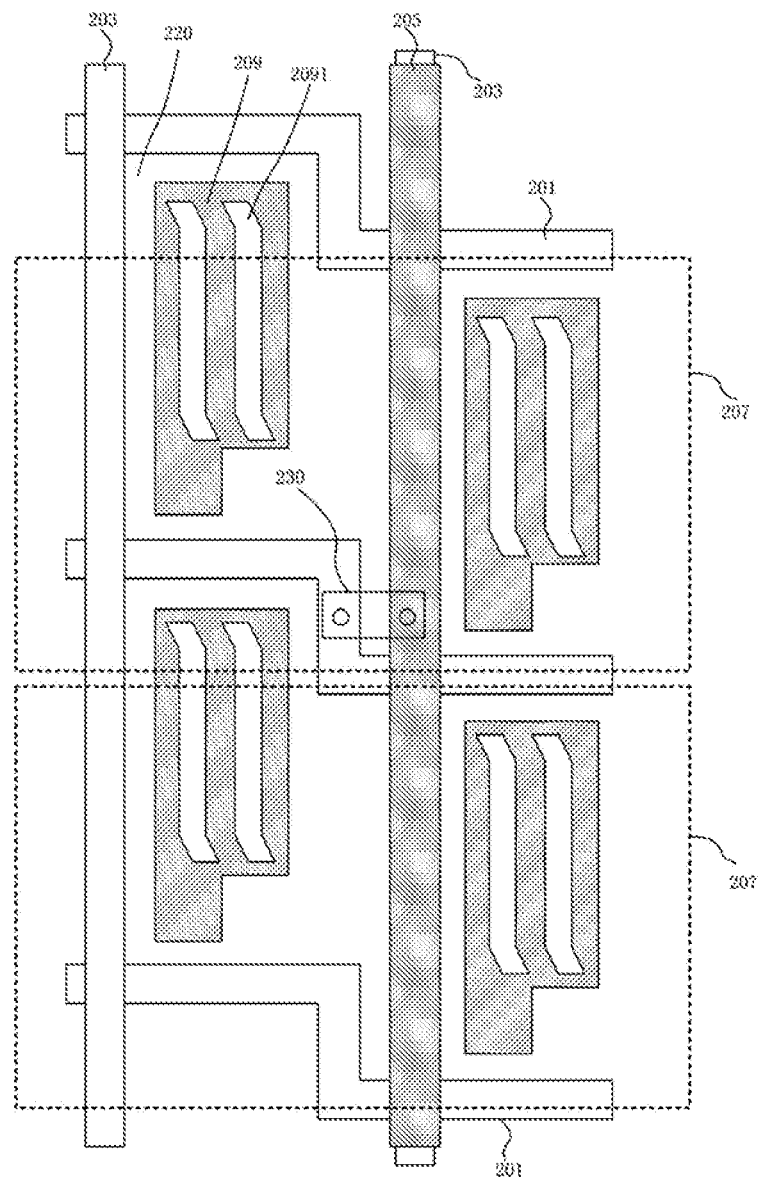
FIG. 14 is a plan view of an array substrate, according to embodiments of the disclosure.

FIG. 14 is a plan view of an array substrate, according to embodiments of the disclosure. As shown in FIG. 14, in embodiments, a plurality of data lines 203 extend in a second direction, each gate line 201 includes a plurality of first parts extending in a first direction and a plurality of second parts extending in the second direction. Optionally, the second parts are obliquely arranged with respect to the second direction.

In embodiments, the black matrix 101 of the color filter substrate 100 is arranged in a way that the opaque regions of the black matrix 101 are in correspondence with the gate lines 201 and the data lines 203. That is, the plurality of gate lines 201 and the plurality of data lines 203 are shielded by the black matrix 101 in an emergent light direction.

A plurality of pixel regions 220 are defined by the gate lines 201 and the data lines 203. Each pixel region 220 corresponds to one light-transmissive region 102 of the color filter substrate 100.

Each common electrode 207 is arranged in a rectangular shape, and substantially covers two pixel regions 220. Each pixel region 220 includes a pixel electrode 209 having a slit 2091. The first signal line 205 is disposed above the corresponding data line 203. The first signal line 205 is electrically connected to the corresponding common electrode 207 via a bridge structure 230.

The common electrode 207 is provided with a through hole 2071. The bridge structure includes a first part 231, a second part 232 and a third part 233. The second part 232 is disposed at the fifth metal layer M5, that is, the second part 232 and the pixel electrode 209 are at the same layer. The first part 231 of the bridge structure runs through the fourth insulating layer 208, the through hole 2071 and the third insulating layer 206 and is further brought into contact with the first signal line 205 so as to achieve the electrical connection. The third part 233 of the bridge structure runs through the fourth insulating layer 208 and is brought into contact with the common electrode 207 so as to achieve the electrical connection. The first part 231 of the bridge structure is substantially perpendicular to the second part 232 of the bridge structure, and the third part 233 is also substantially perpendicular to the second part 232. The first part 231 and the third part 233 are substantially perpendicular to the glass substrate 240. That is, the first part 231 and the third part 233 extend in a third direction which is perpendicular to the glass substrate 240 (that is, perpendicular to the array substrate 200). The third direction is perpendicular to a plane defined by the first direction and the second direction.

The second part 232 of the bridge structure extends substantially in the first direction. The projection of the first part 231 of the bridge structure on the glass substrate 240 is within the projection of the data line 203 on the glass substrate 240. The projection of the third part 233 of the bridge structure on the glass substrate 240 is within the projection of the second part of the gate line 201 on the glass substrate 240.

In the case of no conflict, the technical features of the display panel of the present disclosure may be arbitrarily combined. For example, the display panel includes both the bridge structure as shown in FIG. 9 and the bridge structure as shown in FIG. 12.

The display device employs similar technical principles and achieves similar technical effects as the array substrate and the display panel in the above embodiments, which is not repeatedly discussed herein.

It should be noted that the above description describes embodiments and technical principles of the disclosure. Those skilled in this art will understand that the disclosure is not limited to the embodiments described herein, and various apparent changes, rearrangements and substitutions may be made by those skilled in this art without departing from the protecting scope of the disclosure. Therefore, although the disclosure has been described in detail as above in connection with the embodiments, the disclosure is not to limit thereto and may include other equivalent embodiments without departing from the conception of the disclosure Various modifications and additions can be made to the exemplary embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

I claim:

1. An array substrate, comprising:
   a plurality of gate lines;
   a plurality of data lines intersecting but insulated from the gate line;
   a plurality of pixel regions defined by the plurality of gate lines and the plurality of data lines;
   a plurality of pixel electrodes, wherein each of the plurality of pixel electrodes corresponds to a respective one of the plurality of pixel regions;
   a plurality of first signal lines; and
   a plurality of common electrodes, wherein each of the plurality of common electrodes covers at least one of the plurality of pixel regions,
   wherein the common electrode is electrically connected to the first signal line by a bridge structure, the bridge structure comprises a first part, a second part and a third part electrically connected to each other, the second part and the pixel electrode are arranged in a same layer, the first part and the third part extend in a direction perpendicular to the array substrate, the first part of the bridge structure is directly connected to the first signal line, the third part of the bridge structure is directly connected to the common electrode, and a projection of the second part of the bridge structure on the array substrate falls within a projection of the data line on the array substrate or within a projection of the gate line on the array substrate.

2. The array substrate according to claim 1, wherein a quantity of the plurality of first signal lines is less than a quantity of the plurality of data lines, each of the plurality of first signal lines is disposed on a respective one of the plurality of data lines, and a first insulating layer is provided between the plurality of first signal lines and the plurality of data lines.

3. The array substrate according to claim 2, wherein the plurality of pixel electrodes are arranged on the plurality of common electrodes, or the plurality of common electrodes are arranged on the plurality of pixel electrodes.

4. The array substrate according to claim 2, wherein the plurality of common electrodes are arranged on the plurality of first signal lines, and a second insulating layer is provided between the plurality of common electrodes and the plurality of first signal lines; and the plurality of pixel electrodes are arranged on the plurality of common electrodes, and a third insulating layer is provided between the plurality of pixel electrodes and the plurality of common electrodes.

5. The array substrate according to claim 4, wherein the plurality of first signal lines are arranged in one-to-one correspondence with the plurality of common electrodes, and each of the plurality of first signal lines is electrically connected to only the corresponding common electrode.

6. The array substrate according to claim 5, wherein the plurality of gate lines extend in a first direction, and the plurality of data lines extend in a second direction; and the second part of the bridge structure extends in the second direction, and orthographic projections of the first part, the second part and the third part of the bridge structure on the array substrate cover the corresponding data line.

7. The array substrate according to claim 5, the plurality of gate lines extend in a first direction, and the plurality of data lines extend in a second direction; the second part of the bridge structure extends in the second direction, and an orthographic projection of the first part of the bridge structure on the array substrate covers an intersection region of the plurality of data lines and the plurality of gate lines; and an orthographic projection of the second part of the bridge structure on the array substrate covers the corresponding data line, and an orthographic projection of the third part of the bridge structure on the array substrate covers the corresponding data line.

8. The array substrate according to claim 5, wherein the gate line extends in a first direction, the data line extends in a second direction and the second part of the bridge structure extends in a first direction, a projection of the first part of the bridge structure on the array substrate falls within a projection of an intersection region of the data line and the gate line on the array substrate, a projection of the second part of the bridge structure on the array substrate falls within a projection of the gate line on the array substrate, and a projection of the third part of the bridge structure on the array substrate falls within the projection of the gate line on the array substrate.

9. The array substrate according to claim 5, wherein the gate line extends in a first direction, the data line extends in a second direction and the second part of the bridge structure extends in the first direction, each of the plurality of gate lines comprises a first part extending in the first direction and a second part extending in the second direction, and each of the plurality of data lines extends in the second direction; and an orthographic projection of the first part of the bridge structure on the array substrate covers the second part of the gate line, and an orthographic projection of the third part of the bridge structure on the array substrate covers the corresponding data line.

10. The array substrate according to claim 4, wherein each of the plurality of common electrodes is provided with a through hole, the first part of the bridge structure passes through the third insulating layer, the through hole and the second insulating layer and is electrically connected to the corresponding first signal line, and the third part of the bridge structure passes through the third insulating layer and is electrically connected to the corresponding common electrode.

11. A display panel, comprising:
a color filter substrate;
an array substrate disposed opposite to the color filter substrate; and
a liquid crystal layer disposed between the color filter substrate and the array substrate,
wherein the color filter substrate comprises a black matrix that divides the color filter substrate into opaque regions and light-transmissive regions, and
the array substrate comprises: a plurality of gate lines; a plurality of data lines intersecting but insulated from the plurality of gate lines; a plurality of pixel regions defined by the plurality of gate lines and the plurality of data lines; a plurality of pixel electrodes corresponding to the plurality of pixel regions; a plurality of first signal lines; and a plurality of common electrodes each of which covers at least one of the each of the plurality of common electrodes covers at least one of the plurality of pixel regions,
wherein each of the plurality of common electrodes is electrically connected to a respective one of the plurality of first signal lines by a bridge structure, the bridge structure comprises a first part, a second part and a third part electrically connected to each other, the second part and the plurality of pixel electrodes are arranged in a same layer, the first part and the third part extend in a direction perpendicular to the array substrate, the first part of the bridge structure is directly connected to the respective one of the plurality of first signal lines, the third part of the bridge structure is directly connected to the respective one of the plurality of common electrodes, and a projection of the second part of the bridge structure on the array substrate falls within a projection of a respective one of the plurality of data lines on the array substrate or within a projection of a respective one of the plurality of gate lines on the array substrate.

12. The display panel according to claim 11, wherein a quantity of the plurality of first signal lines is less than a quantity of the plurality of data lines, each of the plurality of first signal lines is disposed on a corresponding one of the plurality of data lines, and a first insulating layer is provided between the plurality of first signal lines and the plurality of data lines.

13. The display panel according to claim 12, wherein the plurality of pixel electrodes are arranged on the plurality of common electrodes, or the plurality of common electrodes are arranged on the plurality of pixel electrodes.

14. The display panel according to claim 12, wherein the plurality of common electrodes are arranged above the plurality of first signal lines, and a second insulating layer is provided between the plurality of common electrodes and the plurality of first signal lines; the plurality of pixel electrodes are arranged on the plurality of common electrodes, and a third insulating layer is provided between the plurality of pixel electrodes and the plurality of common electrodes.

15. The display panel according to claim 14, wherein the plurality of first signal lines are arranged in one-to-one correspondence with the plurality of common electrodes, and each of the plurality of first signal lines is electrically connected to only corresponding one of the plurality of common electrodes.

16. The display panel according to claim 15, wherein the plurality of gate lines extend in a first direction, and the plurality of data lines extend in a second direction; and the second part of the bridge structure extends in the second direction, and orthographic projections of the first part, the second part and the third part of the bridge structure on the array substrate cover the corresponding one of the plurality of data lines.

17. The display panel according to claim 15, the plurality of gate lines extend in a first direction, and the plurality of data lines extend in a second direction; the second part of the bridge structure extends in the second direction, and an orthographic projection of the first part of the bridge structure on the array substrate covers an intersection region of the plurality of data lines and the plurality of gate lines; and an orthographic projection of the second part of the bridge structure on the array substrate covers the corresponding data line, and an orthographic projection of the third part of the bridge structure on the array substrate covers the corresponding data line.

18. The display panel according to claim 15, wherein the plurality of gate lines extend in a first direction, the plurality of data lines extend in a second direction and the second part of the bridge structure extends in the first direction, a projection of the first part of the bridge structure on the array substrate falls within a projection of an intersection region of the data line and the gate line on the array substrate, a projection of the second part of the bridge structure on the array substrate falls within a projection of the gate line on the array substrate, and a projection of the third part of the bridge structure on the array substrate falls within the projection of the gate line on the array substrate.

19. The display panel according to claim 15, wherein the plurality of gate lines extend in a first direction, the plurality of data lines extend in a second direction and the second part of the bridge structure extends in the first direction, the gate line comprises a first part extending in the first direction and a second part extending in the second direction; and an orthographic projection of the first part of the bridge structure on the array substrate covers the second part of the gate line, and an orthographic projection of the third part of the bridge structure on the array substrate covers the corresponding data line.

20. The display panel according to claim 14, wherein the common electrode is provided with a through hole, the first part of the bridge structure passes through the third insulating layer, the through hole and the second insulating layer and is electrically connected to the corresponding first signal line, and the third part of the bridge structure passes through the third insulating layer and is electrically connected to the corresponding common electrode.

* * * * *